United States Patent [19]
Logan et al.

[11] Patent Number: 5,346,735
[45] Date of Patent: Sep. 13, 1994

[54] PEELABLE BARRIER FILM FOR VACUUM SKIN PACKAGES AND THE LIKE

[75] Inventors: Robin H. Logan, Moore; Solomon Bekele, Taylors; Henry W. Stockley, III, Spartanburg; Gloria G. Toney, Greer, all of S.C.

[73] Assignee: W. R. Grace & Co.-Conn, Duncan, S.C.

[21] Appl. No.: 930,882

[22] Filed: Aug. 14, 1992

[51] Int. Cl.$^5$ ............................................... B32B 1/08
[52] U.S. Cl. ................................. 428/36.7; 428/36.6; 428/35.4; 428/349; 428/516; 428/476.1; 426/127
[58] Field of Search .................. 428/36.6, 36.7, 35.4, 428/349, 476.1, 516

[56] References Cited

U.S. PATENT DOCUMENTS

| | | | |
|---|---|---|---|
| Re. 30,009 | 5/1979 | Perdue et al. | 53/433 |
| 3,491,504 | 1/1970 | Young et al. | 53/22 |
| 3,574,642 | 4/1971 | Weinke | 99/174 |
| 3,681,092 | 8/1972 | Titchenal et al. | 99/174 |
| 3,713,849 | 1/1973 | Grindrod et al. | 99/174 |
| 4,055,672 | 10/1977 | Hirsch et al. | 426/127 |
| 4,287,151 | 9/1981 | Esakov et al. | 264/560 |
| 4,638,913 | 1/1987 | Howe, Jr. | 206/632 |
| 4,886,690 | 12/1989 | Davis et al. | 428/36 |
| 4,889,731 | 12/1989 | Williams, Jr. | 426/106 |
| 4,952,628 | 8/1990 | Blatz | 525/58 |
| 4,956,212 | 9/1990 | Bekele | 428/36 |
| 4,977,004 | 12/1990 | Bettle, III et al. | 428/36.7 |
| 5,075,143 | 12/1991 | Bekele | 428/36.6 |
| 5,106,688 | 4/1992 | Bradfute et al. | 428/215 |

FOREIGN PATENT DOCUMENTS

| | | |
|---|---|---|
| 245774 | 7/1963 | Australia. |
| 1258357 | 3/1961 | France. |
| 1286018 | 1/1962 | France. |

Primary Examiner—James J. Seidleck
Assistant Examiner—M. L. Warzel
Attorney, Agent, or Firm—William D. Lee, Jr.; Mark B. Quatt; George Legg

[57] ABSTRACT

A vacuum skin package for packaging fresh red meat and like articles is produced by using a composite, multilayer, oxygen barrier, vacuum skin packaging forming film in which the impermeable film can be manually separated from the non-barrier, oxygen permeable film. After the vacuum skin package is formed to enclose a fresh red meat product in a vacuum the meat will have a purplish color. Then, after storage, the impermeable film can be removed so that the remaining permeable film can admit oxygen to impart the desirable red bloom to the fresh meat. The oxygen permeable film preferably includes a core having enhanced permeation properties. The impermeable film preferably includes an EVOH layer sandwiched between ionomer layers for improved barrier properties.

12 Claims, 2 Drawing Sheets

PEELABLE BARRIER FILM FOR VACUUM SKIN PACKAGES AND THE LIKE

FIELD OF THE INVENTION

This invention relates generally to thermoformable barrier films and to vacuum skin packages which can be made therefrom. More specifically the invention relates to multi-layer gas barrier films where the barrier layer or layers are ethylene vinyl alcohol copolymer. Such films are especially useful for vacuum skin packaging. Ethylene vinyl alcohol copolymer is known to be of high gas impermeability; it is a good barrier to oxygen. But its oxygen permeability is known to increase in the presence of moisture. It has been unexpectedly found that enclosing a layer of it with an ionomer layer on each side will protect it from moisture. Especially, particularly, the present invention relates to such multi-layer gas barrier films useful for vacuum skin packaging wherein the barrier layer or layers may be peeled and separated from the gas permeable layer or layers.

BACKGROUND OF THE INVENTION

Skin packaging can be classified as a vacuum forming process for thermoformable polymeric films. The product on a supporting member serves as the mold for the thermoformable film which is formed about the product by means of differential air pressure. However, the term "vacuum skin packaging" or VSP as it is referred to hereinafter, refers not to the fact that the thermoformable film is formed around the product by vacuum or differential air pressure but to the fact that the product is packaged under vacuum and the space containing the product is evacuated from gases. Thus, there is a need for the film formed around the product and for the support member to be a barrier to oxygen, air, and other gases.

Various skin packaging processes are disclosed in e.g. French Patent No. 1,258,357, French Patent No. 1,286,018 (LaRoach Freres), Australian Patent No. 245,774 (Colbros Proprietary Limited), U.S. Pat. No. 3,491,504 (W. E. Young et all, U.S. Pat. No. RE.30,009 (Perdue et al), U.S. Pat. No. 3,574,642 (Weinke), U.S. Pat. No. 3,681,092 (Titchness et al), U.S. Pat. No. 3,713,849 (Grindrod et al), and U.S. Pat. No. 4,055,672 (Hirsch et al). The Cryovac Division of W.R. Grace & Co. has sold skin packaging thermoplastic materials under the designations LDX-2986, V834HB, and V836HB. LDX-2986 is of the structure: EVA(28% VA)+antiblock/EVA+ionomer/ethylene alpha olefin/EVOH/tie/EVOH/tie/EVA+ionomer/HDPE. V834HB and V836HB are the same structure except V834HB is 4 mil thick and V836HB is 6 mil thick. The structure is: 5% antiblock+95% ethylene butene copolymer/ionomer/EVA/tie/EVOH/tie/EVA-/ionomer/HDPE. Tie is jargon in the industry for an adhesive layer.

In order readily to open packages where plastic film layers have been sealed together to close the package, various tear tabs and easy open mechanisms have been devised. Exemplary are U.S. Pat. No. 4,889,731 (Williams, Jr.), U.S. Pat. No. 4,638,913 (Howe, Jr.), U.S. Pat. No. 4,886,690 (Davis et al), and U.S. Pat. No. 4,956,212 (Bekele). It is a further object of the present invention to provide an improved peelable barrier film for vacuum skin packages having a permeable layer with a high oxygen transmission rate and an impermeable layer with a low oxygen transmission rate such that fresh meat packaged with such film exhibits extended shelf life and improved bloom.

The foregoing and other objects are achieved by the present invention which is described in the Summary of Invention below, shown in the attached Drawings, and further described in the Detailed Description.

SUMMARY OF THE INVENTION

In its broadest sense, the present invention is a multi-layer gas barrier film having an ethylene vinyl alcohol copolymer (hereinafter EVOH) layer wherein said ethylene vinyl alcohol copolymer layer is disposed between a first ionomer layer and a second ionomer layer, each ionomer layer being directly adhered to the EVOH layer without any adhesive therebetween. Each ionomer may be the same ionomer or they may be different ionomers. Optionally, this film may have another EVOH layer, so it would be of the multi-layer structure: ionomer/EVOH/ionomer/EVOH. Each EVOH layer may be the same or different EVOHs. With the other EVOH layer, this is especially useful for vacuum skin packaging, particularly as the gas impermeable portion of a peelable barrier film, as further discussed below.

In one aspect, the present invention is a peelable barrier film suitable for vacuum skin packaging and the like, which is separable into a gas permeable film and a gas impermeable film which can be manually delaminated from each other, wherein:

said gas permeable film comprises a plurality of layers including a heat sealable, polymeric layer; a core layer having an increased oxygen transmission rate; and an optical layer comprising a linear ethylene/alpha-olefin copolymer (EAO) having a density of between about 0.900 and 0.940 g/cc., and said gas impermeable film comprises a plurality of layers including a first EVOH layer immediately adjacent to and in contact with said linear ethylene/alpha-olefin copolymer layer of said gas permeable film so that when delamination occurs the EAO layer will become a first surface layer; a first intermediate layer comprising an ionomer, the first intermediate layer being adjacent to the first EVOH layer; a second EVOH layer adjacent to the first intermediate layer; a second intermediate layer comprising an ionomer, the second intermediate layer being adjacent to the second EVOH layer; an optional layer comprising a polymer selected from an ionomer, ethylene vinyl acetate copolymer, or a mixture thereof; and an outer or second surface layer of polymeric material; said heat sealable layer of the permeable film being capable of sealing to a polymeric surface with a bond strength greater than the force required to delaminate said impermeable film from said permeable film.

In still another aspect, the present invention includes a novel vacuum skin package formed from the above described film.

DESCRIPTION OF THE DRAWINGS

In the drawings which are appended hereto and made a part of this disclosure:

FIG. 2 shows the tab to be on film 6 but it could also be on film 7.

DEFINITIONS

Figure 1:
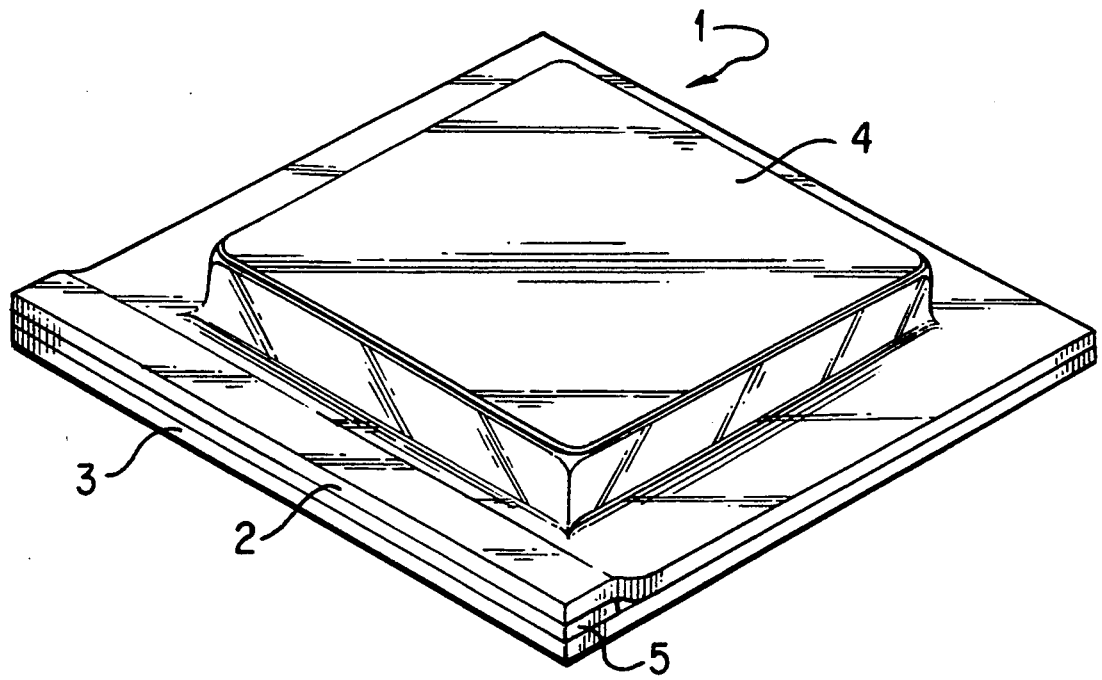
FIG. 1 is a perspective view of one embodiment of a vacuum skin package which can be made using the film and process of the present invention.

As used herein, the following abbreviations and terms have the meanings defined below:

PVDC: PVDC stands for poly vinylidene chloride copolymers. Typical ones are vinylidene chloride vinyl chloride copolymers, vinylidene chloride methyl acrylate copolymers, and vinylidene chloride acrylonitrile copolymers. These are sold under the tradename saran by Dow, which name has become generic in the United States but is a registered trademark in other countries.

EVA: EVA designates ethylene/vinyl-acetate copolymers.

EMA: EMA designates ethylene/methyl acrylate copolymers.

EnBA: EnBA designates ethylene/n-butyl-acrylate copolymers.

LDPE: LDPE means low density polyethylene and designates branched chain polyethylene made by the high pressure process and will have a density below 0.940 g/cc and, most often a density of 0.915 to 0.925 as the 0.926 to 0.939 range is often referred to as the medium density range.

LLDPE: LLDPE means linear low density polyethylene which generally is understood to include that group of ethylene/alpha-olefin copolymers having limited side chain branching and which fall into a density range of 0.910 to 0.940 g/cc. Sometimes linear polyethylene in the density range from 0.926 to 0.940 is referred to as linear medium density polyethylene (LMDPE). Typical brand names are Dowlex from Dow Chemical Company, Ultzex and Neozex from Mitsui Petro Chemical Company, and Sclair from dupont. The alpha-olefin copolymers are typically butene-1, pentene-1, hexene-1, octene-1, etc.

VLDPE and ULDPE: Very low density polyethylene (VLDPE) and ultra-low density polyethylene (ULDPE) mean ethylene/alpha-olefin copolymers which have a density of less than about 0.915 and, more specifically, usually 0.912 or below. Typical VLDPE resins are those designated DFDA by Union Carbide and are believed to principally or usually have butene, or isobutene as a comonomer. The very low density polyethylenes as compared to LLDPE, usually have significantly higher copolymer content and distinctly different properties making them a distinct class of polymers. Typically, resins designated "ULDPE" resins come from Dow and are believed to have octene as the comonomer. There is a slight difference in properties which is thought to be attributable to the comonomer. As used herein the term "linear ethylene/alpha-olefin copolymer having a density of less than 0.915 g/cc" encompasses both VLDPE and ULDPE. (See "Plastics Technology Magazine" for September, 1984 at Page 113 where an article entitled, "INTRODUCING VERY LOW DENSITY PE" appears.)

ETHYLENE COPOLYMER: Ethylene copolymers are copolymers of ethylene and vinyl acetate, alkyl acrylate or alpha-olefin. Thus, all of the above defined terms are ethylene copolymers. Also within the scope of the present definition are chemically modified derivatives of these materials.

EVOH: EVOH means ethylene-vinyl alcohol copolymer or hydrolyzed ethylene/vinyl-acetate copolymer and is sometimes abbreviated "HEVA." EVOH resins are noted for their very good gas barrier properties but tend to be quite moisture sensitive. Typical suppliers of resins are Evalca in the United States and Kuraray in Japan.

IONOMER: Ionomers are metal salts of acrylic acid copolymers, such as metal salts of ethylene/acrylic copolymers or metal salts of ethylene/methacrylic acid copolymers. A typical supplier is dupont, which sells ionomers under the trademark Surlyn.

OPTICAL LAYER: As used herein, an optical layer of a multi-layer film designates a layer included to enhance the appearance characteristics of a film so that a product packaged in the film will have a better appearance.

HDPE: HDPE designates high density polyethylene resins. Such resins are generally made by the low pressure process and have a density of greater than 0.940 g/cc.

Antiblock: Antiblocks are very common additives that alleviate the film sticking to itself when it is wound up or the inner layer of a tubular film sticking to itself when the tube is collapsed and laid flat. Antiblocks typically are syloid in EVA or in LDPE. A common antiblock is sold under the tradename 10075ACP Syloid by Teknor Color.

Tie: Tie is jargon in the plastics industry for an adhesive layer in a film.

DETAILED DESCRIPTION OF PREFERRED EMBODIMENTS

Turning now to the description of the invention reference is first made to FIG. 1 where vacuum skin package 1 is shown. This package comprises a support member 3 which is a gas impermeable member preferably formed of polyvinyl chloride material (PVC) as a substrate material coated with a barrier material and a heat sealing material; or, it can be a material such as a polystyrene foam which also is coated with a barrier material and a heat sealing material. Sometimes cardboard coated with barrier material and heat sealing material is used as a support member. Typical heat sealing materials are branched low density polyethylene (LDPE), ionomers such as the Surlyn brand sold by dupont, ethylene/methacrylic acid copolymers such as Nucrel sold by dupont, ethylene/acrylic acid copolymers such as Primacor sold by Dow, and EVA copolymers. The support member 3 may be flat as shown or it may be formed in the shape of a tray.

The product 4 positioned on the support member 3 will, in general, be a food product such as fresh red meat. Particularly, the prime cuts of beef, pork, and lamb would be the preferred food products. When these products are vacuum skin packaged or packaged in an atmosphere in the absence of oxygen the fresh meat will tend to turn a purplish color and remain that way as long as it is chilled and kept out of contact with oxygen. The bright red "bloom" is restored when the meat makes contact with oxygen again.

Figure 4:
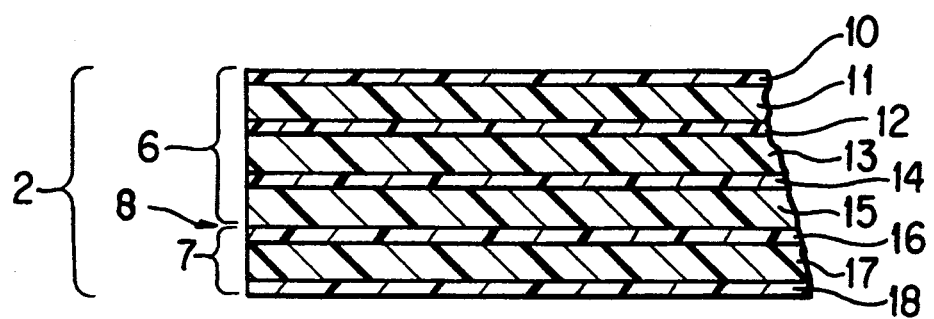
FIG. 4 is a schematic cross section of the composite film of the present invention.

The thermoformable film 2 which covers the product 4 and is sealed around the perimeter of the product in a manner to assume the shape of the product and, thus, become a "skin" is a composite film and is shown in greater detail in FIG. 4. In FIG. 4, which is a schematic representation of the layers in film 2, the two films 6 and 7 which make up the composite 2 are shown bonded at interface 8. Film 2 is preferably coextruded and as shown nine layers are coextruded together. The two layers 15 and 16 which form the interface 8 are materials which do not readily adhere one to the other and thus they form a relatively weak bond. Preferred materials are EVOH for layer 15 and EAO for layer 16. More preferably, layer 16 comprises-LMDPE.

In a preferred embodiment, in order to achieve excellent barrier properties at both low and especially high relative humidities, two layers of EVOH are employed. The first layer 15 is the interface layer with layer 16; the second EVOH layer 13 is disposed between two layers 12 and 14 of ionomer. More preferably, layers 12 and 14 comprise a blend of ionomer and EVA and/or modified polymeric adhesives. Preferred EVA has a vinyl acetate content of 12% to 25% by weight, most preferably 18%. Preferred polymeric adhesives are EVA- and LLDPE- based adhesives.

The impermeable film further includes an abuse layer 10 which is adhered to layer 12 either directly or by layer 11. Layer 11 typically is an implosion resistant layer such as an EVA layer or is a moisture protection layer such as a layer of ionomer, or layer 11 may be a blend of EVA and ionomer.

It is known that the oxygen barrier properties of EVOH decrease in the presence of moisture. For instance, the EVOH moisture problem is discussed by Dow Chemical Corporation in its sales brochure entitled "Rigid Plastic Barrier Containers for Unrefrigerated Foods". The brochure describes the oxygen transmission rate (OTR) for some typical thermoplastic polymers as follows:

| Polymer | Oxygen Transmission cc.mil/100 in$^2$.atm.day |
| --- | --- |
| PVDC | 0.15 |
| Nylon 66 | 2.0 |
| Nylon 6 | 2.6 |
| Polypropylene | 150 |
| EVOH | 0.01 at 0% relative humidity |
| EVOH | 1.15 at 100% relative humidity |

On page 14 of the brochure is a discussion of Dow's rigid tubs of coextruded sheet containing a saran layer for retort packaging. Dow's laboratory staff tested the oxygen permeability of several containers to illustrate the superior oxygen barrier properties under moisture of saran tubs as compared to EVOH tubs. The layers of the sheet were of the structures: PP/tie layer/EVOH/tie layer/PP and PP/tie layer/saran/tie layer/PP. (PP is an abbreviation for polypropylene.) The tub containers were filled with hot water, sealed, and retorted under water at 250 degrees F. (121 degrees C.) for 60 minutes at an air over pressure of 21 psig (2.5 kg/cm$^2$). The retorted containers of both types were then emptied and tested for oxygen transmission. The oxygen transmission rate of the EVOH sheet was more than double that of the saran sheet. Furthermore, although the EVOH sheet dried out over time and its oxygen transmission rate decreased, it was still double that of the saran sheet. Clearly due to the retort moisture present, EVOH could not provide the low oxygen transmission rate that saran did.

Many ways have been sought to protect an EVOH layer from moisture. It has been unexpectedly found that enclosing EVOH barrier layer 13 with ionomer as described appears to improve the oxygen barrier properties of the film. Since the EVOH layer 13 is an interior layer, it is protected from moisture attack and will retain its low oxygen permeability. This effect is enhanced by the presence of an ionomer layer on each side of the EVOH layer 13. This is particularly so for an EVOH with a lower mol % ethylene, such as 27 mol % ethylene. It is not intended to be bound to any theory, but it is believed that for an EVOH with a higher mol % ethylene, such as 44 mol % ethylene, that such an EVOH has less of a tendency to have a decrease of oxygen barrier properties in the presence of moisture. Thus having an ionomer layer on each of of the EVOH layer becomes more helpful for alleviating this moisture problem as the mol % ethylene of the EVOH decreases.

The excellent barrier properties achievable by the present invention result in a VSP web having a wet (by wet is meant 100% relative humidity) oxygen transmission rate (OTR) as low as 70 cc.mil thickness/m$^2$.atmosphere.day at room temperature (which is equivalent to about 4.5 cc.mil thickness/100 in$^2$ atmosphere.day at room temperature).

The test for oxygen transmission is conducted as per ASTM D3985.

The gas permeable film 7 preferably comprises an interface layer 16 of EAO; a sealant layer 18; and a core layer 17 between the interface and sealant layers.

Sealant layer 18 preferably comprises EVA having 12%–28% vinyl-acetate, and/or EMA having 15% to 25% methyl acrylate by weight. A small amount of an anti-block agent can be included. An example of EVA is Exxon XS74.16, a 12% vinyl acetate EVA. Examples of EMA are the resins sold under the tradename EMAC by Chevron or other EMAs sold by Exxon.

The composition of the core layer 17 allows for maximum gas permeability. Layer 17 is typically of ethylene copolymers such as EVA, EnBA, ULDPE, or blends thereof, which have high OTRs allowing for a more rapid bloom and longer bloomed color retention of meats which have aged in the VSP barrier package. Also, blends of EVA/ionomer or of EnBA/ionomer could be used. These blends of EVA/ionomer or of EnBA ionomer for layer 17 are known from U.S. Pat. No. 4,956,212, mentioned above. Most ionomers are stiffer than most EVAs, so ionomer toughens the gas permeable film 7. But ionomer is also a better oxygen barrier than EVA, so ionomer is decreasing the gas permeability whereas it is desired to have film 7 be of high gas permeability. So it is desired to have plasticizer such as white mineral oil in the ionomer to increase the oxygen transmission rate of the ionomer. Generally, ionomers (such as Surlyn, which are metal neutralized ethylene methacrylic acid copolymers) do not hold plasticizers. The plasticizer blooms out of such materials. However, when blended with an EVA or EnBA at 40/60, 30/70, 20/80 ratios, ionomers can be plasticized. Another group of Surlyn ionomers (1856) which are terpolymers of ethylene methacrylic acid ester can be plasticized by themselves. But the plasticizer can cause other problems when it migrates, so it is a trade off with how much ionomer for stiffening is used as use of ionomer is desirably with plasticizer to increase oxygen transmission rate. This can readily be determined by the person of ordinary skill in the art without undue experimentation.

It has also been found that, when EnBA and EVA have the same mol % comonomer of nBA and VA respectively, then the use of EnBA alone as a core component produces a film of higher gas permeability as compared to an analogous film having an EVA core component. Other materials which can be used with or without plasticizer modification include copolymers of ethylene and ester type acrylic derivatives such as ethylene methyl acrylate, ethylene ethyl acrylate, etc. However, a preferred core composition for the present permeable film is a EnBA (30%BA) or a blend of En-BA(30%BA)+EnBA(18%BA). A preferred EnBA for use in the present invention has about 30% butyl acrylate although copolymers having from about 5% to 35% of butyl acrylate, such as EnBA with 18% butyl acrylate are also within the scope of the present invention. It has further been found that inclusion of a small amount of a plasticizer into a core of EVA produces a permeable film with an acceptably high oxygen transmission rate.

Layer 16 can be a ULDPE of density of between about 0.900 and 0.915 grams/cc. For obtaining good package optics, a density of about 0.912 is preferred. An example of such a material is Attane 4002 from Dow. Materials of 0.906 grams/cc can also be used. Also preferred are LMDPE materials, e.g. 0.935 grams/cc. A commercial example of LMDPE is Dowlex 2037. Use of LMDPE in this construction improves the peelability of the impermeable film 6 from the permeable film 7.

Layers 15 and 13 are both EVOH layers. Preferred resins contain between about 27 and 48 mole percent of ethylene. An especially preferred commercial resin is EVAL from Evalca. Layers 15 and/or 13 can also include amorphous nylon. Commercial examples of semiaromatic amorphous nylons of hexamethylene diamine, isophthalic and terephthalic acids containing bis(p-amino cyclohexy) methane for inclusion in the present composite are Selar PA 3426, from Du Pont; and Grivory 21, from Emser Industries. Others include Selar PA 3508; Gelon A 100 from General Electric; Durethane T 40 from Mobay; Allied XA 1722 from Allied Signal.; Novamid X 21 from Mitsubishi Chemical Industries Limited; and MXD6 from Mitsubishi Gas Chemical Co., Inc.

Layers 12 and 14 are implosion resistant layers which also serve to enhance the oxygen barrier properties of the film by shielding the EVOH of layer 13 from moisture. Preferably, layers 12 and 14 comprise a blend of ionomer and EVA and/or modified polymeric adhesives. Preferred EVA has a VA content of 12% to 25% by weight, most preferably 18%. Preferred polymeric adhesives are EVA- and LLDPE- based adhesives. Most preferred compositions for layers 12 and 14 are:

35% ionomer+35%EVA+30% EVA based adhesive; or
70% ionomer+30% EVA based adhesive; or
70% ionomer+30% LLDPE based adhesive.

Layer 10 is an outer layer, normally an outermost layer which provides high gloss and good moisture barrier properties. A preferred material for layer 10 is HDPE such as Soltex J60-800C-147 from Solvay.

Optional layer 11 functions as an implosion resistant layer when it is of a polymer such as EVA or as a moisture protection layer when it is or an ionomer, and is preferably an ionomer or a blend such as that disclosed for layers 12 and 14.

Preferably, the present composite film is crosslinked. The preferred method for crosslinking is irradiation, although chemical crosslinking such as by peroxides is also within the scope of the present invention. Irradiation of the film may be accomplished by the use of high energy electrons, ultra violet radiation, X-rays, gamma rays, beta particles, etc. Preferably, electrons are employed from about 0.5 megarads up to about 18 megarads (MR) dosage level. The irradiation source can be any electron beam generator operating in a range of about 150 kilovolts to about 6 megavolts with a power output capable of supplying the desired dosage. The voltage can be adjusted to appropriate levels which may be for example 1,000,000 or 2,000,000 or 3,000,000 or 6,000,000 or higher or lower.

Many apparatus for irradiating films are known to those of skill in the art. For purposes of the present invention, the irradiation is preferably carried out at a dosage within the range of from about 9 MR to about 18 MR and most preferably within the range of from about 12 MR to about 14 MR.

The specific best mode of the forming web for vacuum skin packaging and the like which is separable into permeable and impermeable films has as the permeable skin film or layer 7, a construction as follows:

| Sealant layer (18) | Core layer (17) | Optical layer (16) |
|---|---|---|
| 0.20-0.60 | 1.00-2.50 | 0.10-0.20 mils |

Wherein:
Sealant=EVA or EMA
  EVA copolymer having 4% to 28% VA from Du Pont or Exxon, or EMA copolymer having 4% to 24% MA from Exxon or Chevron with an anti-block agent;
Core=EnBA with nBA content of 15%–30% such as Lotryl 30 BA 2 from Elf Atochem which has 30% nBA, with or without a plasticizer, or an EnBA/EVA blend with or without a plasticizer, or an EnBA/EMA blend with or without a plasticizer, or an EnBA(18%BA)/EnBA(30%BA) blend with or without a plasticizer;
Optical=LMDPE from Dow, DOWLEX 2047.

The impermeable or peelable barrier film has the following construction:

| EVOH/ | IONOMER | /EVOH/IONOMER | /OPTIONAL/HDPE(Outside) |
|---|---|---|---|
| | + | + | |
| | EVA | EVA | |
| | + | + | |
| | EVA based tie | EVA based tie | | wherein the ionomer layer is a blend of ionomer with tie and with EVA or modified LLDPE or modified EVA. One of the EVA resins that is preferred is Elvax 3165 from DuPont. The preferred EVA based tie is Bynel CXA 3062 from DuPont.

Further, although in its preferred embodiment, the present invention is directed to a composite film having a permeable web and an impermeable web, it is also within the scope of the present invention to provide the present improved barrier web with a prior art permeable web and further, to provide the present improved permeable web with a prior art barrier web depending on the requirements of any given application. To make the composite film or web, a coextrusion process similar to that described in U.S. Pat. No. 4,287,151 to Esakov et al may be employed. Suitable annular or flat sheet multi-layer dies must, of course, be used and these are well known in the art.

Figure 2:
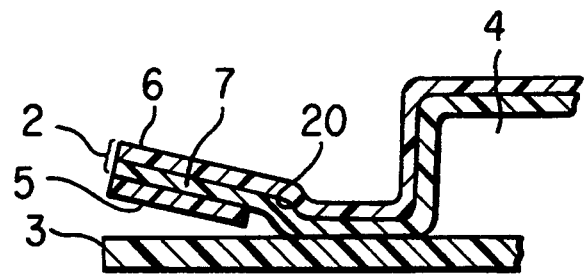
FIG. 2 shows one embodiment of a tab arrangement for delaminating or peeling apart the two films comprising the composite peelable film of the present invention.
Figure 3:
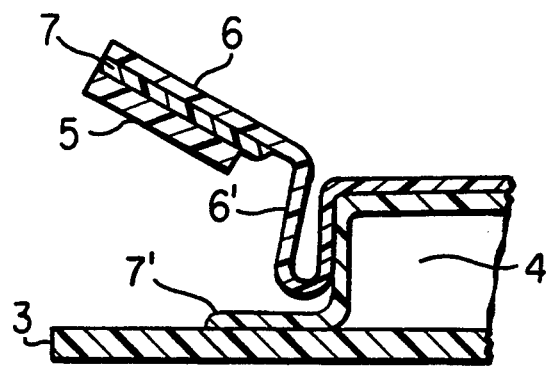
FIG. 3 shows the peeling process shown in FIG. 2 underway after rupture of a portion of the permeable film has taken place.

Looking now at FIGS. 2 and 3, tab 5 has been laid across one edge of the vacuum skin package as can be seen by the dotted line in FIG. 1 so that in forming of upper web 2 (the composite film) around product 4, it does not adhere to the support 3. This allows for a tab to form as can be seen in FIG. 2 that can be gripped and moved upwardly by the fingers to a position shown in FIG. 3. In this position it can be seen that the permeable film 7 has delaminated at interfacing rather than its bond with the support member 3. This leaves the film portion 7' firmly adhered to the support member 3. This type of strong bond is formed between the EMA or EVA surface of the film 7 with the coated PVC of the support member. Surfaces such as EVA and EnBA adhere strongly to each other and their bond strength is greater than the internal cohesive strength of film 7.

Also seen in FIG. 3 is the beginning of the delamination of the permeable film 6 from the impermeable film 7. The already peeled apart portion 6' has separated from the bonded portion 7' so that the entire impermeable film 6 may be peeled from the permeable film 7 leaving the inner "skin" package comprising support member 3, peeled, permeable film 7', and product 4. When product 4 is a fresh red meat product, it will, within half an hour to an hour, regain its bright red bloom and is then ready for display in a showcase or retail case.

Upon reading and becoming familiar with the disclosure herein, equivalent layer combinations and packages will likely become evident or obvious to those skilled in the art. For example, instead of or in addition to blending EVA or polymeric adhesives into the intermediate layers of the impermeable film, separate tie layers can be included in the film structure to bond, e.g. the intermediate ionomer layers to the EVOH layers. Although the film of the invention is especially useful for VSP applications, it can also be used in other packaging applications.

EXAMPLES

Percentages in the examples are percentages by weight, unless otherwise indicated as mol %.

EXAMPLE I

Film (1) and film (2) were made in which a layer on each side of the EVOH (EVOH layer 13 in the drawings) was a blend of EVA based tie, ionomer, and EVA as described below. The EVOH was 27 mol % ethylene. The films were fully coextruded and after coextrusion, irradiated with an electron beam at 13 MR. These films (1) and (2) were of the multi-layer structure, from sealing layer to outside abuse layer as follows:

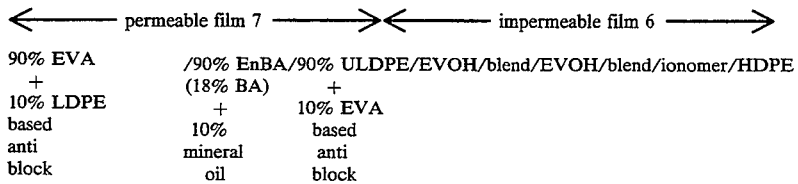

The films were tested at 40 degrees F and 100% relative humidity (RH) for oxygen transmission rate (OTR), and the results were as follows:

| Film | blend layer of ionomer + EVA + EVA based tie | OTR 40 degrees F. 100% RH/ cc.mil/day/ m².atm | OTR 40 degrees F. 100% RH/cc/ day/m².atm at X thickness[1] |
|---|---|---|---|
| (1) | 35% ionomer 35% EVA 30% EVA based tie | 356 | 49 |
| (2) | 20% ionomer 50% EVA 30% EVA based tie | 477 | 70 |

[1]where for the OTR of the right-hand column, the X mil actual thickness for the first film with the 49 OTR was 7.2 mils and for the second film with the 70 OTR was 6.8 mils.

EXAMPLE II

Several additional films were made as in Example I, except these were of the multi-layer structures of film (I) or of film (II) as follows, with the mil thickness of each layer indicated below that layer for a total film thickness of 6.35 mils:

Film (I)

⇐——permeable film——⇒⇐——impermeable film 6——⇒

W / U / X / Y / Z / Y / Z / ionomer/ HDPE 0.40　2.0　0.2　0.3　1.1　0.25　1.20　0.5　0.4

Film (II)

⇐——permeable film——⇒⇐——impermeable film 6——⇒

W / U / X / Y / Z / Y / V / HDPE 0.40　2.0　0.2　0.3　1.1　0.25　1.7　0.4 where:
U = EnBA (30%BA) or 50%EnBA(18%BA)+50% EnBA(30%BA)
W = EVA (18 to 25% VA)+LDPE based antiblock or = EMA (18 to 24% MA)+LDPE based antiblock
X = LLDPE (density 0.912 g/cc)+EVA based antiblock or ULDPE (density 0.905 g/cc)+EVA based antiblock or LMDPE (density 0.935 g/cc)+EVA based antiblock
Y = EVOH (27 or 44 mol % ethylene) or 85% EVOH+15% amorphous nylon
Z = a blend of:

35% ionomer+35% EVA (18% VA)+30% EVA based tie or
70% ionomer+30% EVA based tie or
70% ionomer+30% LLDPE based tie V=a blend of:
35% ionomer+35% EVA (18% VA)+30% EVA based tie or
ionomer+EVA based tie or
ionomer+LLDPE based tie Of these the preferred was Film (I) where:
W=EVA+LDPE based antiblock
X=LMDPE (density 0.935 g/cc)+EVA based antiblock
Y=EVOH (27 or 44 mol % ethylene)
Z=35% ionomer+35% EVA (18% VA)+30% EVA based tie

EXAMPLE III

The peel strength of some of the films of Examples I and II were tested. This was done by pulling apart the film at the interface, i.e. at the junction of the ethylene alpha olefin internal layer of permeable film 7 and the EVOH layer of impermeable film 6, and measuring the pounds of force per linear inch of film to pull apart the permeable film from the impermeable film. This was done before electron beam irradiation. Then it was done after electron beam irradiation to cross link the film.

The cross linking is desirable to toughen the film, but it can also increase peel strength at the interface. Increase in peel strength at the interface is undesirable as it is wanted to pull apart the film at this interface after packaging the meat so the meat will bloom.

For the ethylene alpha olefin, it was found that use of LMDPE at the interface and also use of higher 44 mol % ethylene EVOH at the interface, resulted in a peel strength at the interface which was not deleteriously affected (i.e. not increased in a statistically significant manner) by electron beam cross linking. Also, when amorphous nylon was added to the EVOH layer at the interface, the peel strength was not deleteriously affected by cross linking. The results are summarized below, where the ethylene alpha olefin (EAO) of the permeable film at the interface and the EVOH of the impermeable film at the interface are noted:

| Film | Peel interface EAO | Peel interface EVOH | Peel Strength before Cross Linking | Peel Strength after Cross Linking |
|---|---|---|---|---|
| (1) | LMDPE (0.935) | 27 mol % | 0.035 | 0.046 |
| (2) | ULDPE (0.905) | 44 mol % | 0.034 | 0.038 |
| (3) | ULDPE (0.905) | 27 mol % (85% EVOH + 15% amorphous nylon) | 0.367 | 0.326 |
| (4) | ULDPE (0.905) | 27 mol % | 0.027 | 0.422 |

EXAMPLE IV

Two films were made as in Example II, and one film had an ionomeric polymer layer on each side of the second EVOH layer of the impermeable film and the other film had a non-ionomeric polymer layer on each side of the second EVOH layer of the impermeable film. The EVOH was EVOH with 44 mol % ethylene. The OTR of these films was measured. Two packages of fresh read meat were packaged with each film and stored for 14 days in a high humidity chamber of 100% relative humidity at 40 degrees F. Then the top of the meat was observed for discoloration. It was found from the OTR that the film with the non-ionomeric polymer layer on each side of the EVOH layer had a lower, and thus more desirable, OTR, but in the actual packaging tests of fresh red meat, this film resulted in actual discoloration of 5% of the top of the meat for one package, whereas the film that had an ionomeric polymer layer on each side of the second EVOH layer did not result in any discoloration at all of the fresh red meat. It is believed this discoloration was due to use of EVOH that had 44 mol % ethylene, i.e. the presence of ionomer on each side of the EVOH was less helpful for protection of the EVOH from moisture with 44 mol % ethylene EVOH than with 27 mol % ethylene EVOH. The results are summarized below.

| | Normalized OTR 40 degrees F./ cc.mil/m$^2$/ day/atm 100% RH | Normalized OTR 73 degrees F./ cc.mil/m$^2$/ day/atm 100% RH | 40 degrees F. 100% RH after 14 days % of Top Surface of Meat Discolored | |
|---|---|---|---|---|
| | | | Pack 1 | Pack 2 |
| Film (1) with ionomer | 128 | 812 | 0% | 0% |
| Film (2) without ionomer | 109 | 610 | 0% | 5% |

EXAMPLE V

Film samples are made, as described above, but where the films are of the 3-layer structure: A1/B/A2, where A1 and A2 are ionomeric layers, and may be the same ionomeric composition or each may be a different ionomeric composition, and each of layers A1 and A2 may be the same thickness or each may be a different thickness, and where B is a barrier layer of EVOH. Thus, the 3-layer film is: ionomer/EVOH/ionomer. Preferred is:

B=EVOH (27 or 44 mol % ethylene) or 85% EVOH+15% amorphous nylon and

A1 and A2 are the same or different and=a blend of:
35% ionomer+35% EVA (18% VA)+30% EVA based tie or
70% ionomer+30% EVA based tie or
70% ionomer+30% LLDPE based tie or
20% ionomer+50% EVA+30% EVA based tie Most preferred is A1 and A2 each is 35% ionomer+35% EVA (18% VA)+30% EVA based tie, and B is EVOH (27 mol % ethylene).

Also, 4-layer films are made where the above-described 3-layer film has another EVOH layer so that the 4-layer film is of the structure:
ionomer/EVOH/ionomer/EVOH The other EVOH layer may be EVOH (27 or 44 mol % ethylene) or may be 85% EVOH+15% amorphous nylon, and preferably is EVOH (27 mol % ethylene).

For the 3-layer films or the 4-layer films, preferred thicknesses are 0.20 to 0.30 mil for each of the EVOH layers, and 1.0 to 1.8 mil for each of the ionomer layers. All of these films should have excellent, low OTRs at high humidity of 100%RH.

While certain representative embodiments and details have been shown for the purpose of illustration, numerous modifications to the formulations described above can be made without departing from the invention disclosed.

What is claimed is:

1. A web for vacuum skin packaging and the like which web is separable into permeable and impermeable films, said web comprising a permeable film and an impermeable film, wherein said permeable film comprises (a) a sealant layer;
    (b) a core layer comprising ethylene copolymer of relatively high gas permeability;
    (c) an optical layer comprising a linear ethylene/alpha-olefin copolymer having a density of between about 0.900 and 0.940 gms/cm$^3$; and said impermeable film comprises
    (d) a first EVOH layer immediately adjacent to the optical layer;
    (e) a first intermediate layer selected from the group consisting of an ionomer and an ionomer blend, the first intermediate layer being adjacent to the first EVOH layer;
    (f) a second EVOH layer adjacent to the first intermediate layer;
    (g) a second intermediate layer selected from the group consisting of an ionomer and an ionomer blend, the second intermediate layer being adjacent to the second EVOH layer;
    (h) an optional layer comprising a polymer selected from an ionomer, an ethylene vinyl acetate copolymer, and mixtures thereof; and
    (i) an outer or second surface layer of an abuse resistant polymeric material;

said sealant layer of the permeable film being capable of sealing to a polymeric surface with a bond strength greater than the force required to delaminate said impermeable film from said permeable film at said optical layer (c) and said first EVOH layer (d).

2. The film of claim 1 wherein the sealant layer comprises a polymeric material selected from the group consisting of ethylene alpha olefin copolymer, ethylene vinyl acetate copolymer, ethylene methyl acrylate copolymer, and mixtures thereof.

3. The film of claim 1 wherein the core layer comprises a polymeric material selected from the group consisting of ethylene butyl acrylate copolymer, ethylene vinyl acetate copolymer, ethylene methyl acrylate copolymer, and blends thereof.

4. The film of claim 1 wherein at least one of said intermediate layers further comprises a blend of ionomer and a second polymeric material selected from the group consisting of ethylene vinyl acetate copolymer, modified polymeric adhesives, and mixtures thereof.

5. The film of claim 1 wherein at least one of the first and second EVOH layer further comprises a blend of EVOH and amorphous nylon.

6. The film of claim 1 wherein the abuse resistant polymeric material of the outer layer is selected from high density polyethylene and polypropylene.

7. The film of claim 1 wherein the film is cross-linked.

8. A vacuum skin package wherein the forming web is a film according to claim 1.

9. The film of claim 1 where the film is cross-linked, the the first ethylene vinyl alcohol copolymer layer (d) comprises an ethylene vinyl alcohol copolymer with 44 mol % ethylene, and the optical layer (c) comprises linear medium density polyethylene with a density of 0.935 g/cc.

10. A multilayer gas barrier film, said film comprising a barrier layer of ethylene vinyl alcohol copolymer disposed between a first ionomer layer selected from the group consisting of an ionomer and an ionomer blend and a second ionomer layer selected from the group consisting of an ionomer and an ionomer blend, each ionomer layer being adjacent to the barrier layer of ethylene vinyl alcohol copolymer without any adhesive therebetween.

11. The film of claim 10, further including another layer of ethylene vinyl alcohol copolymer, wherein said film has the multi-layers: first ionomer layer, ethylene vinyl alcohol copolymer layer, second ionomer layer, other ethylene vinyl alcohol copolymer layer.

12. The film of claim 1 where the film is crosslinked and one or both of said EVOH layers comprises an EVOH copolymer having between about 27 mol % and 44 mol % ethylene.

* * * * *